United States Patent [19]
Kleppen

[11] Patent Number: 4,771,158

[45] Date of Patent: Sep. 13, 1988

[54] REPLACEABLE INSULATOR FOR WELDING TORCH

[75] Inventor: Arthur L. Kleppen, Kent, Wash.

[73] Assignee: C-K Systematics, Inc., Auburn, Wash.

[21] Appl. No.: 85,557

[22] Filed: Aug. 17, 1987

[51] Int. Cl.[4] .................... B23K 9/00

[52] U.S. Cl. .................... 219/75; 219/121.5

[58] Field of Search .............. 219/74, 75, 70, 121 PM, 219/121 PN, 121 PP, 137.31, 137.41, 137.62

[56] References Cited

U.S. PATENT DOCUMENTS

| | | | |
|---|---|---|---|
| 2,512,706 | 6/1950 | Anderson | 219/75 |
| 3,042,791 | 7/1962 | Reeh | 219/75 |
| 3,548,143 | 12/1970 | Reeh | 219/75 |
| 3,634,643 | 1/1972 | Himmelman | 219/75 |
| 3,783,233 | 1/1974 | dal Molin | 219/74 X |
| 3,909,585 | 9/1975 | Sanders et al. | 219/130 |
| 4,309,588 | 1/1982 | Hill | 219/75 |
| 4,590,354 | 5/1986 | Marhic et al. | 219/121 PM |

FOREIGN PATENT DOCUMENTS

| | | | |
|---|---|---|---|
| 2631742 | 1/1978 | Fed. Rep. of Germany | 219/137.62 |
| 683266 | 2/1965 | Italy | 219/121 PP |
| 558617 | 3/1980 | U.S.S.R. | 219/121 PP |

*Primary Examiner*—E. A. Goldberg
*Assistant Examiner*—C. M. Sigda
*Attorney, Agent, or Firm*—Keith D. Gehr

[57] ABSTRACT

An easily replaceable ventilated external insulator for a tungsten inert gas, plasma, or similar welding torch comprises a generally cylindrical member molded from a resilient heat resistant electrical material such as a silicone rubber. The inner wall of the insulator has a plurality of parallel alternating grooves and lands. The grooves communicate at each end with circumferential grooves which act as manifolds. At least one of these circumferential grooves has a vent to release to the atmosphere any gases formed between the insulator and the body of the torch head during welding operations. The vent is located so that these gases are directed away from the weld zone and do not act to contaminate the welding atmospehre.

6 Claims, 1 Drawing Sheet

REPLACEABLE INSULATOR FOR WELDING TORCH

BACKGROUND OF THE INVENTION

The present invention relates to a replaceable ventilated external insulation element for use on tungsten inert gas or plasma welding torches or similar articles.

Inert gas shielded welding torches have been in common use for over four decades. These employ a fixed or consumable metal electrode contained within a torch head so that the welding zone is surrounded by a blanket of an inert gas. The gases most normally used are helium and argon. Welding torches of this type are used especially with metals that are highly sensitive to oxidation. Aluminum is perhaps the most common of these metals but the method is critical for more exotic materials such as titanium and zirconium. Similarly, plasma torches employ a jet of extremely hot ionized gas to cause fusion in the weld zone. Once again, it is standard practice for the weld area to be blanketed with an inert gas to prevent oxidation.

In similar fashion to conventional arc welding, inert gas shielded torches employ high electrical currents at relatively low voltages. They tend to be rather small and compact in comparison to the rather bulky welding rod holders used for conventional arc welding. Inert gas shielded torches are normally covered with a material which serves both as electrical and thermal insulation. Very often because of the extremely high heat generated in a confined environment, they are also water cooled to prevent premature burnout. The commonly used insulating materials are phenolic resins and silicone rubbers. These are molded around the torch at the time of its manufacture. Both the silicone and phenolic gradually deteriorate from the severe use environment. When they fail by cracking or spalling the entire torch must normally be replaced. There is an additional problem. Gases given off by deteriorating insulating material can adversely affect weld quality.

As exemplary of prior art insulated welding torches the following U.S. Pat. Nos. can be cited: Anderson, 2,512,706; Reeh, 3,548,143; Sanders et al., 3,909,585; Hill, 4,309,588; and Marhic et al., 4,590,354.

To the present inventor's knowledge no one has heretofore addressed this problem of insulation deterioration and its adverse effects. The problems associated with insulation deterioration have simply been accepted as inevitable. However, the present invention presents a novel and unexpected solution to the problem of deterioration of welding torch insulation.

SUMMARY OF THE INVENTION

The present invention is a replaceable ventilated external insulator for a tungsten inert gas or plasma welding torch or similar article. The insulator comprises a generally cylindrical member formed of a resilient, heat resistant, electrical insulating material. The member has outer and inner wall surfaces and at least one, preferably two, open ends. The inner wall surface has a plurality of generally parallel alternating longitudinal lands and grooves. These grooves are in communication at each end with a generally circumferential groove, also formed in the inside wall. This serves as a manifold so that all of the grooves are interconnected. At least one of the circumferential grooves has a vent to release to the atmosphere any gases which may be formed between the insulator and the torch body during welding operations.

The insulator may have a side wall aperture to admit a side arm of a welding torch.

Preferably the insulator is made of a resilient heat resistant material such as a molded silicone rubber. This has sufficient stretch so that it may be slipped on over the body portion of a torch head for easy replacement of a deteriorated insulator.

Preferably the vent from the groove to the outside environment is formed so that any gases vented are directed away from the welding zone.

It is an object of the present invention to provide an easily replaceable insulator for a tungsten inert gas or similar welding torch.

It is another object to provide an insulator for a welding torch that directs any gases formed from decomposition of the insulator away from the welding zone.

These and many other objects will become readily apparent to one skilled in the art upon reading the following detailed description taken in conjunction with the drawings.

DESCRIPTION OF THE PREFERRED EMBODIMENTS

The insulator comprising the present invention is particularly beneficial in two ways. If it has deteriorated after a long period of use or for other reasons, the entire torch need not be scrapped but the insulator can be simply and inexpensively replaced. A further advantage is the improvement in weld quality by removing any gases away from the weld zone which might be formed due to deterioration of the torch insulation.

Figure 2:
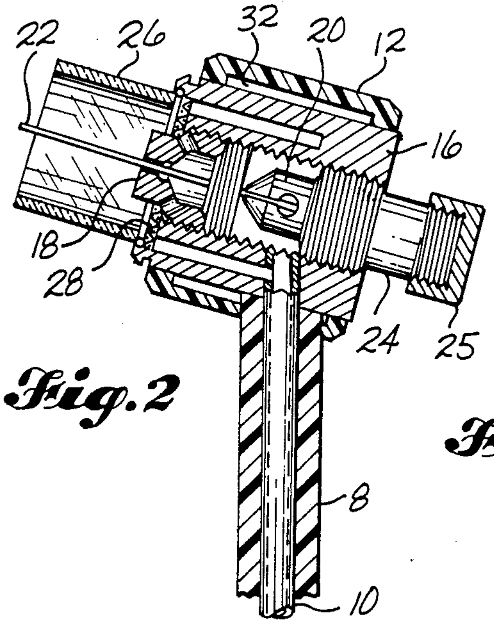
FIG. 2 is a longitudinal cross section of the torch head shown in FIG. 1, with the addition of electrode holding elements.
Figure 1:
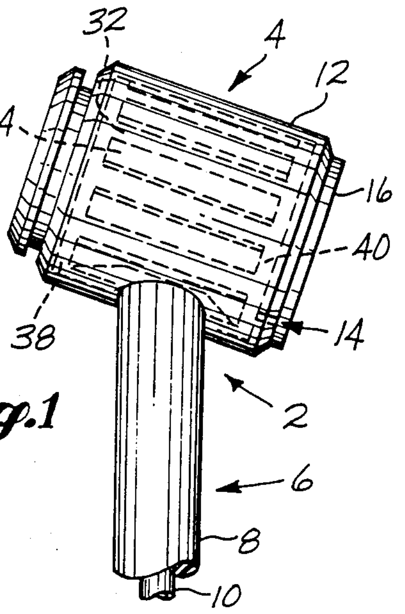
FIG. 1 is a side elevation of the insulator in place on a typical torch head.
Figure 3:
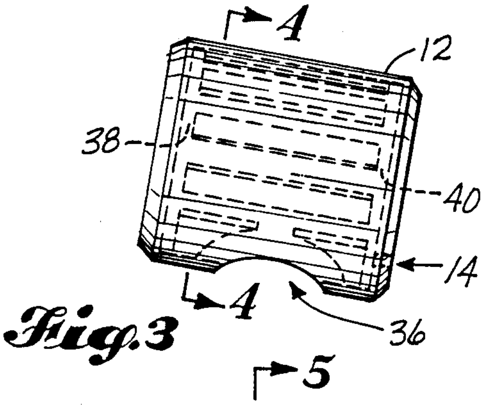
FIG. 3 is a side elevation of the insulator.
Figure 5:
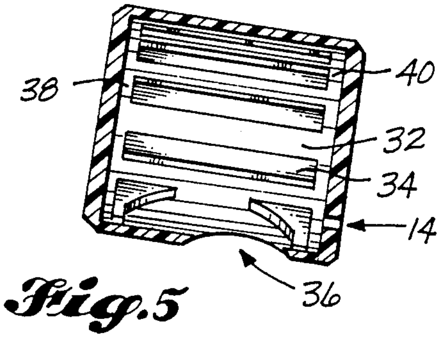
FIG. 5 is a longitudinal cross section taken along line 5—5 of FIG. 4.
Figure 4:
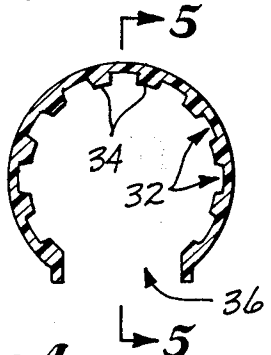
FIG. 4 is a transverse cross section along line 4—4 of FIG. 3.

Reference is now made to FIG. 1 where a welding torch is generally shown at 2. This consists of a head portion 4 and a handle or side arm 6 which is only partially shown in the drawing. The torch itself is wholly conventional and does not form any part of the present invention. The handle will normally have a molded on phenolic or silicone rubber insulation 8. This is not normally as subject to deterioration as the insulation around head portion 4 since it is somewhat removed from the zone where the heat is the most intense. The handle or side arm may contain one or more electrical current and fluid conductors 10. In the present example the torch head is not water cooled and tubing 10 serves to conduct an inert gas such as argon or helium to the head from which it is distributed to the weld zone. Tubing 10 also conducts the electrical current to the electrode. The torch head is covered with the insulator 12 which comprises the present invention.

Before describing the insulator, the rest of the torch structure will be briefly noted. The torch has a metal head or body unit 16 with a threaded interior portion.

Into this is threaded a collet body 18. A collet 20 holding electrode 22 is then placed in the torch head above the collet body. The collet is locked about the electrode by the threaded collet jamb 24 having a finger knob 25. A gas cup 26 is fixed in conventional manner to the torch head. Finally, a gas diffusion screen 28 serves to produce a laminar gas flow around electrode 22 during operation. Again it is emphasized that the structure of the torch itself is considered old and does not form any part of the present invention.

Replaceable insulator 12 has a plurality of parallel longitudinally oriented grooves 32 separated by ribs or lands 34. At each end the grooves are in communication with circumferential grooves 38, 40 which act as manifolds to collect any gases which might be formed between the insulator and the body portion of the torch head. An aperture 36 permits entry of side arm 8. Vent 14 permits the egress of any gases which might be formed between the insulator and the body portion of the torch head during welding operations.

Figure 6:
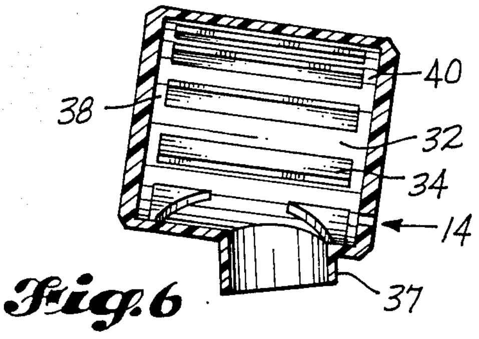
FIG. 6 is an alternative version of the insulator shown in a view similar to FIG. 5.

In an alternative version, the insulator may have an integral short side arm 37, as seen in FIG. 6. This extends sidewall aperture 36 a short distance along the side arm of the torch.

Having thus described the best mode presently know of constructing and using the replaceable insulator, it will be evident to those skilled in the art that many variations can be made without departing from the spirit of the invention. The invention should be considered as limited only by the following claims.

I claim:

1. A replaceable ventilated external insulator for a tungsten inert gas or similar welding torch which comprises:

a generally cylindrical member formed of a resilient, heat resistant electrical insulating material, said member having outer and inner wall surfaces and at least one open end;

said inner wall surface having therein a multiplicity of spaced apart generally parallel grooves, said grooves all being shorter than the generally cylindrical member and positioned so that they do not reach either end of the member, said grooves being in communication at each end with a generally circumferential groove formed in the inner wall surface so as to interconnect the longitudinal grooves, at least one of the circumferential grooves having a vent which passes through the outer wall, so that when the insulator is installed on a welding torch head the circumferential grooves act as gas collection manifolds and the vent serves to release to the atmosphere any gases formed under the insulator during welding operations.

2. The insulator of claim 1 which further has an aperture through the wall of the cylindrical member to admit a torch side arm.

3. The insulator of claim 2 which further has a short side portion attached to the outer wall surface adjacent the aperture to extend the sidewall aperture.

4. A tungsten inert gas or similar welding torch which comprises in combination;

a metallic welding torch head; and a replaceable ventilated insulator snugly surrounding the torch head, wherein the insulator further comprises a generally cylindrical member formed of a resilient, heat resistant electrical insulating material, said member having outer and inner wall surfaces and at least one open end;

said inner wall surface having therein a multiplicity of spaced apart generally parallel grooves, said grooves all being shorter than the generally cylindrical member and positioned so that they do not reach either end of the member, said grooves being in communication at their ends with generally circumferential grooves formed in the inner wall surface, the circumferential grooves serving to interconnect the longitudinal grooves and, in combination with the adjacent torch head, form gas collection manifolds, at least one of the circumferential grooves having a vent which passes through the outer wall to release to the atmosphere any gases formed between the insulator and torch head during welding operations.

5. The welding torch of claim 4 in which the torch head has a side arm and the insulator has a sidewall aperture to admit the side arm.

6. The welding torch of claim 5 in which the insulator further has a short side arm portion extending the sidewall aperture along the side arm of the torch.

* * * * *